(12) United States Patent
Roberts et al.

(10) Patent No.: US 7,460,484 B2
(45) Date of Patent: Dec. 2, 2008

(54) LAWFUL INTERCEPT OF TRAFFIC CONNECTIONS

(75) Inventors: Peter Roberts, Stittsville (CA); Carl Rajsic, Nepean (CA)

(73) Assignee: Alcatel Lucent, Paris (FR)

( * ) Notice: Subject to any disclaimer, the term of this patent is extended or adjusted under 35 U.S.C. 154(b) by 731 days.

(21) Appl. No.: 10/934,509

(22) Filed: Sep. 7, 2004

(65) Prior Publication Data

US 2006/0050644 A1    Mar. 9, 2006

(51) Int. Cl.
*H04J 3/14* (2006.01)
(52) U.S. Cl. .................... 370/244; 370/250; 370/395.1; 709/224
(58) Field of Classification Search ........................ None
See application file for complete search history.

(56) References Cited

U.S. PATENT DOCUMENTS 6,021,117 A * 2/2000 Juniper et al. ............... 370/252

6,850,506 B1 * 2/2005 Holtzman et al. ........... 370/335
7,142,840 B1 * 11/2006 Geddes et al. .............. 455/411

* cited by examiner

*Primary Examiner*—Chi H. Pham
*Assistant Examiner*—Soon D. Hyun

(57) ABSTRACT

Apparatus and method are provided for dynamically establishing lawful interception taps within connection-oriented communication networks. Taps are established automatically upon establishment of a main connection by embedding collection identifier information within connection setup messages as a new form of information element. The collection identifier information includes information enabling a tap function within an interception node to establish a connection, such as an SPVC or an SVC, to a monitoring station. The collection identifier information may include any of a forward direction ATM address, a backward direction ATM address for use in bi-directional communications, a forward direction end point and a backward direction end point for use in establishing SPVC tap connections, and a connection identifier for use in establishing SVC tap connections. Tap connections can be established either during or after establishment of the main connection.

6 Claims, 7 Drawing Sheets

LAWFUL INTERCEPT OF TRAFFIC CONNECTIONS

FIELD OF THE INVENTION

The invention relates to monitoring of telecommunications traffic, and more particularly to establishment of taps in connection-oriented packet traffic.

BACKGROUND OF THE INVENTION

Providers of telecommunication services must provide means by which law enforcement agencies can carry out lawful interception and monitoring of telecommunication traffic. For example, the Communications Assistance for Law Enforcement Act (CALEA) of the Federal Communication Commission in the United States of America defines carrier and equipment manufacturer responsibilities for enabling legally authorized surveillance of target communications. Although not yet implemented in ATM systems, packet technologies are covered by the CALEA.

In ATM networks, lawful interception of a communication can be established by establishing a tap at an interception node through which the connection passes between the source node and the destination node. A tap connection is established between the tap and a monitoring station. Within the interception node, the tap copies any communications over the connection, and transmits the copied communications to the monitoring point over the tap connection. The tap is most easily established manually along a Permanent Virtual Circuit (PVC). Since the connection being monitored is a PVC and the route of the connection between the source node and the destination node is known, the choice of which node is to be the interception node is straightforward. A tap connection can then be established manually as a PVC between the interception node and the monitoring station. Such a tap connection is a statically configured connection, and behaves similarly to a point-to-multi-point PVC.

Unfortunately, if the main PVC fails or is moved, the tap must be re-established manually even if the connection follows the same route. This is because the PVC is defined by the ingress and egress endpoints on the interception node, and the PVC may use different endpoints once it is re-established. Additionally, the manual establishment of the tap and of the tap connection is tedious. An automated method of establishing taps would allow faster and more flexible establishment of taps for the purposes of lawful interception of communications within an ATM network.

SUMMARY OF THE INVENTION

In accordance with one aspect of the invention, a method is provided for establishing taps within a connection-oriented communication network which carries a main connection originating at a source node. A switched tap connection is launched between an interception point and a monitoring station. A tap is then created for copying traffic from the main connection onto the tap connection. The interception point may be located at an interception node separate from the source node, in which case a Surveillance Information Element (SIE) is generated at the source node, the SIE including collection identifier information identifying a destination. The SIE is transmitted into the network. The interception node monitors for receipt of the SIE. Upon receipt of the SIE at the interception node, the collection identifier information is extracted from the SIE. A tap connection is established from the interception node to the destination specified within the collection identifier information.

The methods of the invention, including the filtering method, the monitoring methods, and the tap method, may be stored as instructions on a computer-readable medium, to be executed by a computer processor. Apparatus is also provided for implementing the methods of the invention.

The method and apparatus of the present invention allow taps on communications within connection-oriented communication networks to be established dynamically. By automating the process by providing a new information element embedded into connection setup messages, taps can be established more quickly. Furthermore, by establishing the tap connection or connections as a switched connection(s), the automated re-route capabilities of switched connections can be taken advantage of to re-route the tap connection(s) when the path along which the tap connection is located fails or when a main connection fails or needs to be moved, since the tap can be almost immediately re-established at the same or at a new interception point within the network. Automation of switched tap connections also allows monitoring to be turned off and on by sending message over signaling links to the interception node, which can then establish or tear down the switched tap connection. The invention can be applied to any sort of switched connection within a connection-oriented network, such as SVCs, SPVCs, and LSP connections.

BRIEF DESCRIPTION OF THE DRAWINGS

The features and advantages of the invention will become more apparent from the following detailed description of the preferred embodiment(s) with reference to the attached figures, wherein.

It will be noted that in the attached figures, like features bear similar labels.

DETAILED DESCRIPTION OF THE EMBODIMENTS

Figure 1:
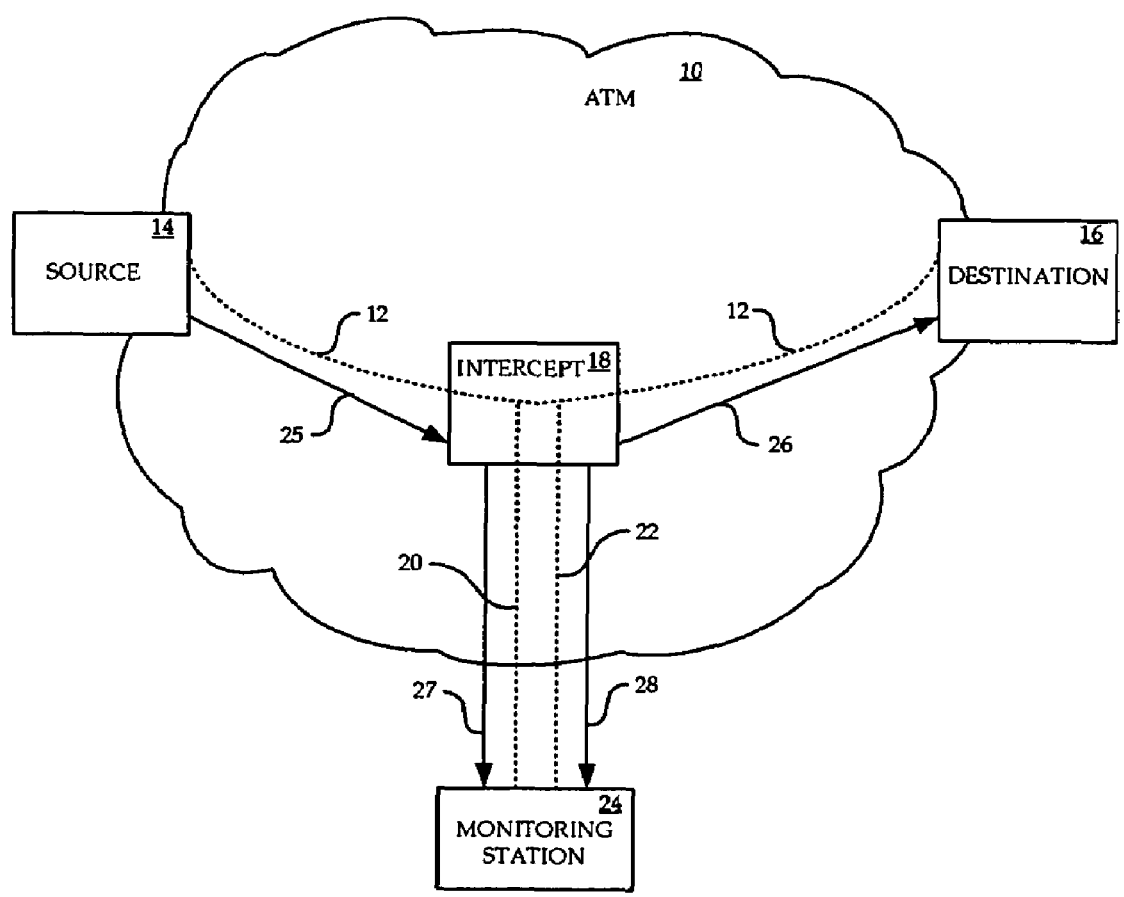
FIG. 1 is a diagram of an example ATM network in which a tap has been established according to one embodiment of the invention.

Referring to FIG. 1, an example of an Asynchronous Transfer Mode (ATM) network 10 is shown. Within the ATM network 10, a main connection 12 is established between a source node 14 and a destination node 16. The main connection 12 passes through an interception node 18, which may be any node within the ATM network 10 through which the main connection 12 passes, including the source node 14 and the destination node 16. Two tap connections 20 and 22 are established between the interception node 18 and a monitoring station 24. One tap connection monitors data flow from the source node 14 to the destination node 16, and the other tap connection monitors data flow from the destination node 16 to the source node 14. The monitoring station 24 is outside the ATM network, and may be for example a workstation under the administrative control of a law enforcement agency. Each of the main connection 12 and the tap connections 20 and 22 is either a Soft Permanent Virtual Circuit (SPVC) or a Switched Virtual Circuit (SVC). The main connection may have either bi-directional data flow or uni-directional data flow, the uni-directional data flow passing either from the source node to the destination node or from the destination node to the source node. The tap connections 20 and 22 have unidirectional data flow from the main connection at the interception node 18 towards the monitoring station 24.

The various nodes within the ATM network 10 establish connections by sending signals over signaling links. The source node 14 sends a first setup request 25 towards the interception node 18, the first setup request containing information indicating to where the tap connections 20 and 22 are to be established. The interception node 18 sends a second setup request 26 towards the destination node 16. The interception node 18 also sends two tap setup requests 27 and 28 towards the monitoring station 22. The nature of these setup requests is described below with reference to FIG. 2 to FIG. 6.

Figure 2:
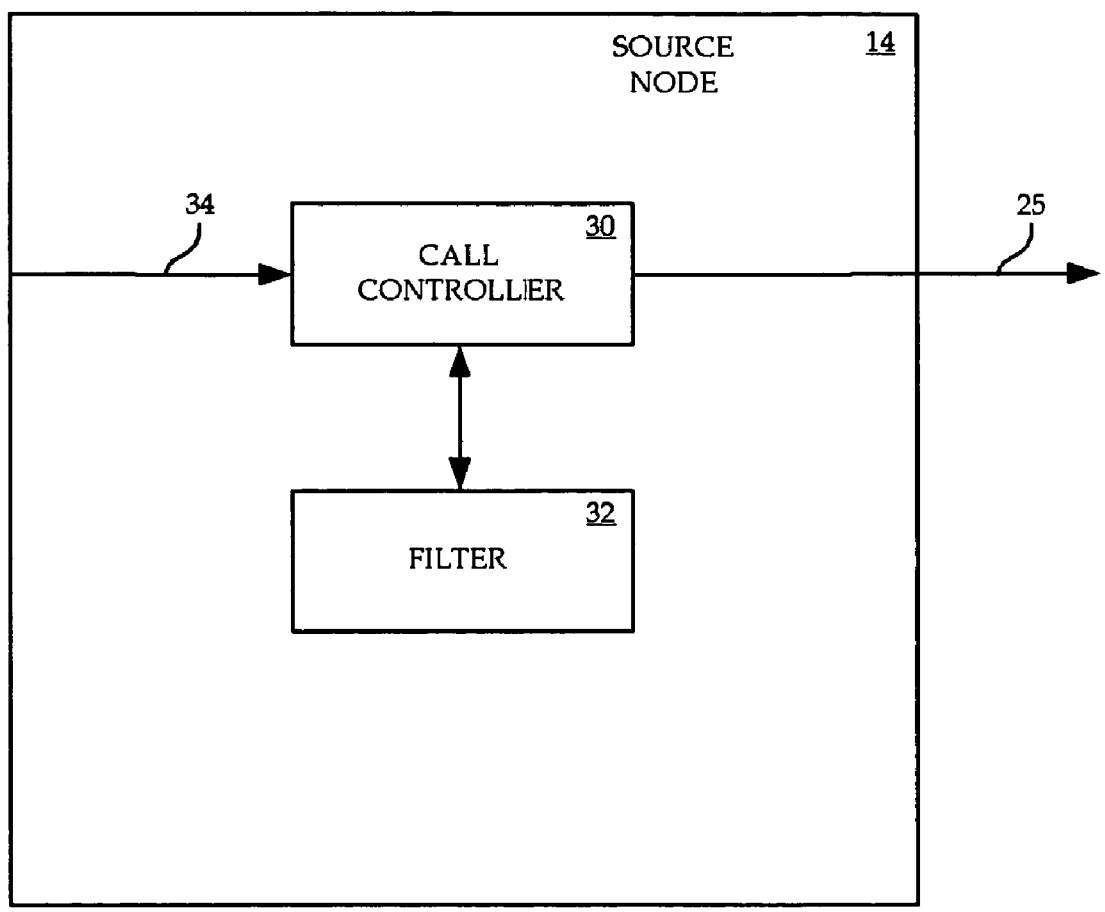
FIG. 2 is a diagram of the source node of FIG. 1 according to one embodiment of the invention.

Referring to FIG. 2, details of the source node 14 according to one embodiment of the invention is shown. The source node 14 includes a call controller 30 and a filter 32. The call controller 30 receives a setup indication 34, which may originate within the source node 14 (as shown) if the connection is a Soft Permanent Virtual Circuit (SPVC) or from outside the source node 14 if the connection is a Switched Virtual Circuit (SVC). The call controller 30 passes a copy of the setup indication to the filter 32. The filter 32 determines whether the connection being requested is to be monitored. If the connection is to be monitored, the filter 32 generates a Surveillance Information Element (SIE) and passes the SIE to the call controller 30. The call controller 30 inserts the SIE into the setup request 25, and launches the setup request 25 along the route of the main connection 12. The methods carried out by the filter 32 are described in more detail below with respect to FIG. 5 and FIG. 6.

Figure 3:
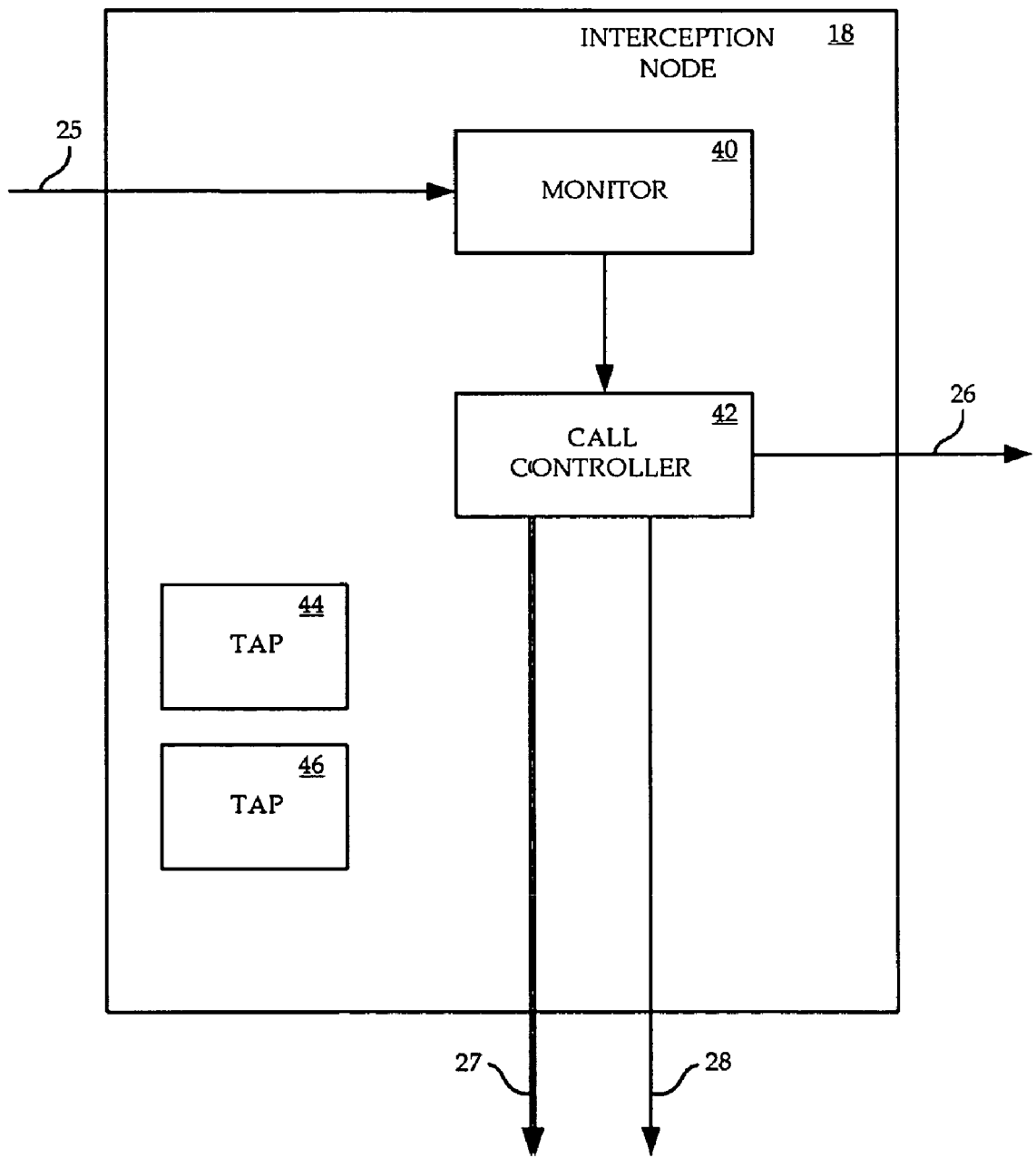
FIG. 3 is a diagram of the interception node of FIG. 1 according to one embodiment of the invention.

Referring to FIG. 3, details of the interception node 18 according to one embodiment of the invention is shown. The interception node 18 includes a monitor 40 and a call controller 42. When the interception node 18 receives the setup request 25, the monitor 40 determines whether the setup request 25 includes an SIE. The interception node monitor 40 informs the call controller 42 of the SIE or, if there is no SIE within the setup request 25, informs the call controller 42 of the absence of an SIE. The call controller removes any SIE from the first setup request 25, and sends a second setup request 26 which is otherwise identical to the first setup request 25 along the route of the main connection 12 towards the destination node 16. If the first setup request 25 includes an SIE, then the call controller 42 also sends two tap setup requests towards the destinations specified in the SIE (as described below), and creates two taps 44 and 46. The methods carried out by the monitor 40 and the call controller 42 are described in more detail below with reference to FIG. 5 and FIG. 6.

The filter 32, source node call controller 30, monitor 40, and interception node call controller 42 are modules comprising instructions for carrying out the methods defined herein with respect to the respective module. The instructions are preferably in the form of software instructions loaded into a computer processor. Alternatively, the instructions may be in the form of hardware, including an integrated circuit, designed to execute the logic defining the methods implemented by the modules. If in the form of software instructions, the instructions may be stored on computer-readable media.

Figure 4:
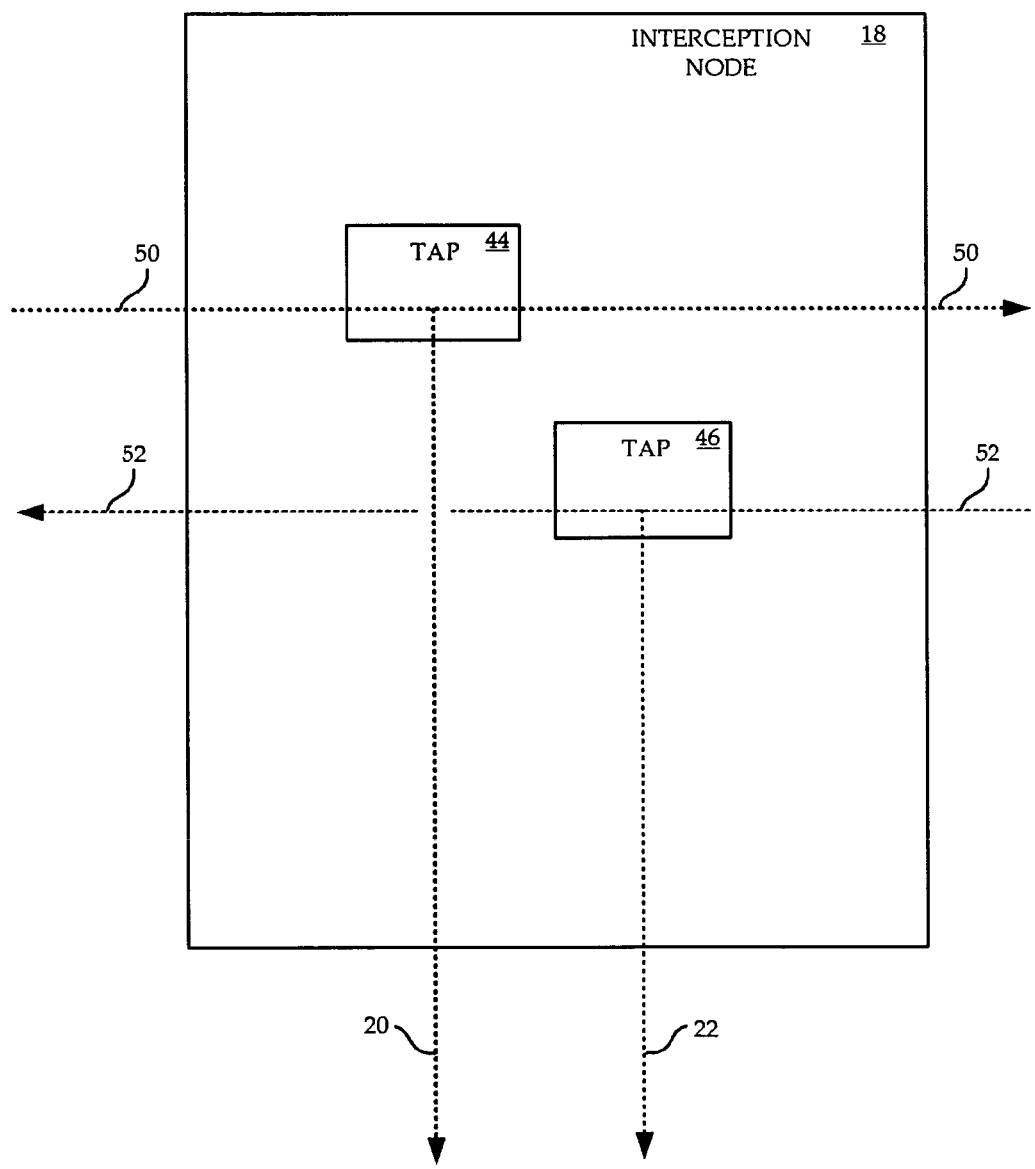
FIG. 4 is a diagram of the interception node of FIG. 1 in operation according to one embodiment of the invention.

Referring to FIG. 4, a diagram of the operation of the taps 44 and 46 in operation within the interception node 18 according to one embodiment of the invention is shown. The main connection 12 is bi-directional, and includes forward direction traffic 50 and backward direction traffic 52. The first tap 44 copies traffic from the forward direction traffic 50 and passes the copied traffic along the first tap connection 20 where the traffic is sent towards the monitoring station 24. The second tap 46 copies traffic from the backward direction traffic 52 and passes the copied traffic along the second tap connection 22 where the traffic is sent towards the monitoring station 24.

Figure 5:
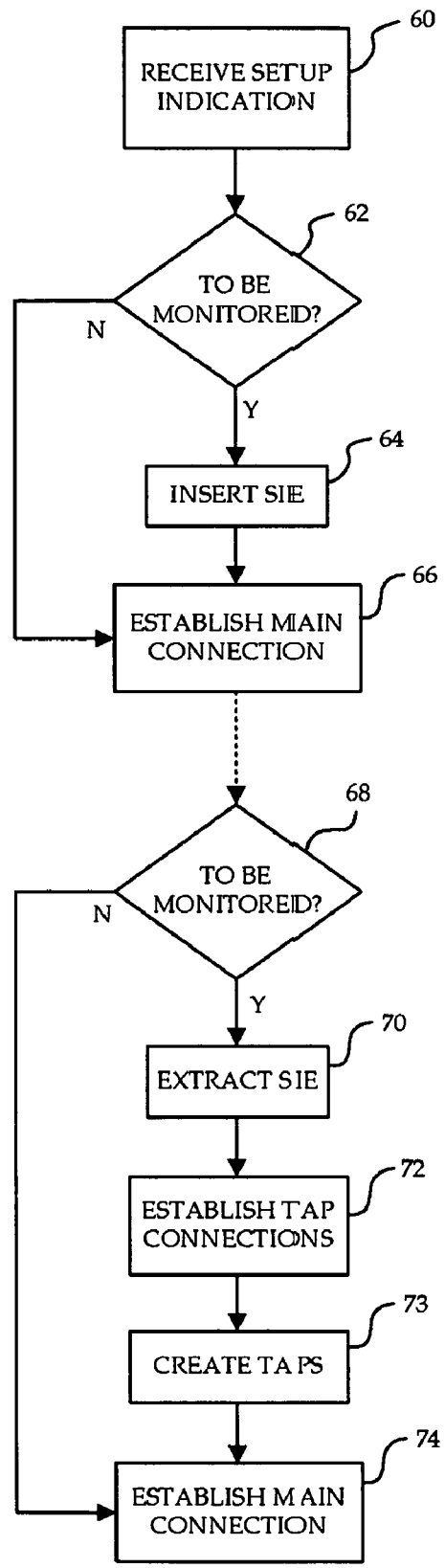
FIG. 5 is a flowchart of a method by which a tap is established during establishment of a main connection according to one embodiment of the invention.

Referring to FIG. 5, a method of establishing the tap connection 20 at the same time that the main connection 12 is established according to one embodiment of the invention is shown. At step 60 the call controller 30 within the source node 14 receives a setup indication 34. The setup indication 34 includes, amongst other information, an originating party identification and a terminating party identification. The call controller 30 passes party identification information to the filter 32 within the source node 14. The party identification information includes at least one of the originating party identification and the terminating party identification, and may be passed to the filter 32 as part of a copy of the setup indication. At step 62 the filter 32 determines whether the communication is to be monitored by comparing either the originating party identification or the terminating party identification, or both, or other identifying information in the setup message, with values in a database.

If the filter 32 determines at step 62 that the communication is to be monitored then the filter 32 locates the party identification information or other identifying information of the setup message within a database and retrieves collection identifier information. The filter 32 passes the collection identifier information to the call controller 30, which at step 64 generates an SIE which includes the collection identifier information. Broadly, the collection identifier information specifies the location of the monitoring station 24. If the tap connection is to be an SPVC, the collection identifier information includes two ATM addresses and two endpoints, each endpoint corresponding to one of the ATM addresses. If the tap connection is to be an SVC, the collection identifier information includes two ATM addresses and main connection identifier information.

The call controller 30 inserts the SIE into a setup request 25 at step 64 and launches the setup request at step 66 in order to begin establishment of the main connection 12 in the ATM network 10. If the filter 32 determines at step 62 that the communication is not to be monitored, then the filter 32 signals to the call controller 30 that no SIE is to be included in the setup message (for example, by returning a NULL string to the call controller), and at step 66 the call controller launches a setup request which contains no SIE.

Within the interception node 18, the monitor 40 receives the setup request for the communication along the main connection 12 being established. At step 68 the monitor 40 determines whether the communication is to be monitored by determining whether the setup request includes an SIE. If the monitor 40 determines that the communication is to be monitored, then the monitor 40 extracts the SIE from the setup request at step 70 and passes the SIE to the call controller 42. The call controller 42 retrieves the collection identifier information from the SIE. If the tap connections 20 and 22 are to be SPVCs, then at step 72 the call controller 42 establishes SPVCs between the interception node 18 and the monitoring station 24. The call controller 42 sends a first setup request 27 identifying the first ATM address and the first end point specified in the collection identifier information, and sends a second setup request 28 identifying the second ATM address and the second end point specified in the collection identifier information.

If the tap connections 20 and 22 are to be SVCs, then the call controller 42 establishes at step 72 SVCs between the interception node 18 and monitoring station 24. The call controller 42 sends a first setup request 27 identifying the first ATM address specified in the collection identifier information. Completion of the SVC tap connection to an end point is left to the monitoring station 24 identified by the first ATM address specified in the collection identifier information, and the monitoring station 24 can determine the endpoint from the main connection identifier information which may identify, for example, the originating party and the direction of traffic flow for this connection (either from source to destination or destination to source). Similarly, the call controller 42 sends a second setup request 28 identifying the second ATM address specified in the collection identifier information, and completion of the second SVC tap connection to an end point is left to the monitoring station 24, which can determine a second endpoint from the main connection identifier information.

Once the tap connections 20 and 24 are established, the call controller 42 creates at step 73 two taps 44 and 46, one tap corresponding to each tap connection 20 and 22. Once the taps 44 and 46 are created, or if the monitor 40 determines that the communication is not to be monitored, then the call controller continues to establish the main connection 12 at step 74 by sending a setup request 26 towards the destination node 16, the setup request 26 containing no SIE specifying collection identifier information or containing the SIE altered in such a way that no further intercept nodes can use the information contained therein.

Figure 6:
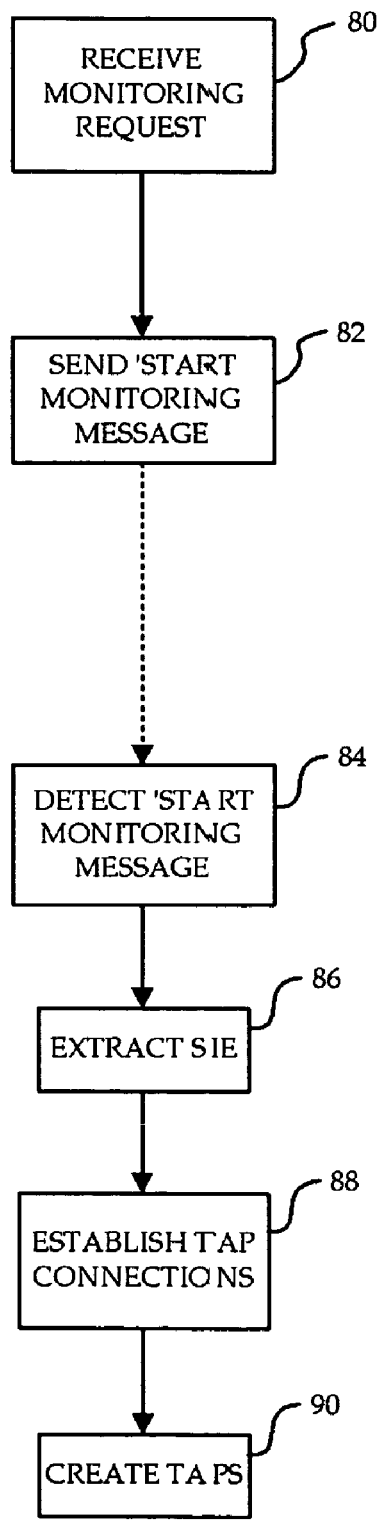
FIG. 6 is a flowchart of a method by which a tap is established after a main connection is established according to one embodiment of the invention.

Referring to FIG. 6, a method of establishing the tap connections 20 and 22 after the main connection 12 is established according to one embodiment of the invention is shown. Within the source node 14, the call controller 30 is informed by an operator at step 80, for example through a Network Management System, that monitoring of the main connection 12 is to begin. The call controller 30 generates a 'Start Monitoring' message. The Start Monitoring message includes an SIE corresponding to the communication. The SIE is as described above with reference to FIG. 5, and may either be supplied by the operator or be generated by the call controller 30 from party identification information supplied by the operator. At step 82, the call controller 30 transmits the 'Start Monitoring' message over a signaling link along the route of the main connection 12, much as the call controller 30 would do for more conventional signaling messages such as setup requests and notification requests.

Within the interception node 18, the monitor 40 monitors for arrival of 'Start Monitoring' messages. At step 84 the monitor 40 receives a 'Start Monitoring' message. At step 86 the monitor extracts the SIE from the 'Start Monitoring' message and passes the SIE to the call controller 42 requesting that the call controller 42 begin monitoring of the main connection 12. At step 88 the call controller 42 establishes tap connections between the interception node 18 and the monitoring station 24 as described above with reference to step 72 of FIG. 5. The call controller 42 then creates two taps 44 and 46 at step 90, as described above with reference to step 73 of FIG. 5. The call controller 42 does not forward the 'Start Monitoring' message beyond the interception node 18.

Once the tap connections are established, either during establishment of the main connection as described with reference to FIG. 5 or after establishment of the main connection as described with reference to FIG. 6, the tap 44 copies any communication along the main connection 12 in the forward direction to the first tap connection 20, where it is passes to and is monitored at the monitoring station 24. The tap 46 copies any communication along the main connection 12 in the backward direction to the second tap connection 22, where it passes to and is monitored at the monitoring station 24.

It has been assumed in the description above that the traffic carried by the main connection 12 is bi-directional. Alternatively, the traffic could be uni-directional, such as would generally be the case for multi-cast traffic. If the traffic over the main connection 12 is uni-directional, then there would only be a need for one tap connection 20, and the second tap connection 22 would be omitted. Referring back to FIG. 3 and FIG. 4, the second tap 46, the second tap connection 22, and the second tap setup request 28 would be omitted. Only one of the forward direction traffic 50 and the backward direction traffic 52 would be present within the main connection 12, since no traffic would be being passed in the other direction, and the first tap 44 would be applied to whichever traffic is present. Referring back to FIG. 5, at step 64 the call controller 30 within the source node 14 would generate an SIE having collection identifier information specifying only one ATM address and, if the tap connection is to be an SPVC, only one endpoint.

Figure 7:
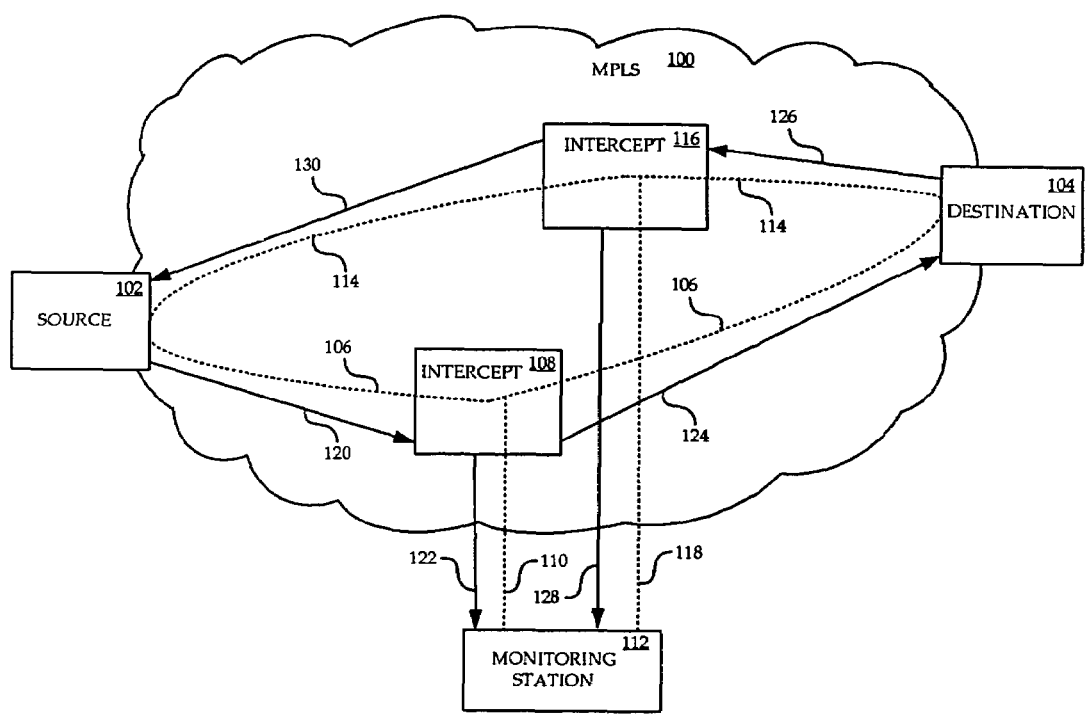
FIG. 7 is a diagram of an example Multiprotocol Label Switching network in which taps have been established according to one embodiment of the invention.

The invention has been described with respect to ATM networks. More generally, the invention may be implemented in any connection-oriented communication network. For example, referring to FIG. 7, an example bi-directional communication path within a Multiprotocol Label Switching (MPLS) network is shown. The MPLS network 100 includes a source node 102 and a destination node 104. A forward main connection 106 passes through a first interception node 108, and communications intercepted at the first interception node 108 are passed along a forward tap connection 110 to a monitoring station 112. A backward main connection 114 passes through a second interception node 116, which may be the same physical node as the first interception node 108 but more generally will be a separate node. Communications intercepted at the second interception node 116 are passed along a backward tap connection 118 to the monitoring station 112.

The tap connections 110 and 118 are established in a manner similar to that described above with reference to FIG. 5 and FIG. 6. However, the monitors within each interception node 108 and 116 establish only one tap connection to the monitoring station 112, since the traffic along each of the forward main connection 106 and the backward main connection 114 is unidirectional. The source node 102 sends a first reservation request 120 to the first interception node 108, the first reservation request 120 including an SIE having collection identifier information including information for performing taps in the forward and backward direction. The first interception node 108 establishes the first tap connection 110 by sending a second reservation request 122 towards the monitoring station 112, the second reservation request identifying the termination of the connection from the forward direction collection information which was included in the SIE generated by the source node 102. The first interception node 108 removes the forward direction collection information, or alternatively marks the information as completed, and then includes the SIE in a third reservation request 124 which is sent towards the destination node 104 in order to complete the forward main connection 106.

The destination node 104 sends a fourth reservation request 126 towards the second interception node 116 in order to begin establishment of the backward main connection 114. The fourth reservation request 126 includes the same SIE that was originally received by the destination node 104 from the reservation request message 124. The second interception node 116 detects the SIE, and establishes the second tap connection 118 by sending a fifth reservation request 128 towards the monitoring station 112. Since the SIE includes only the backward direction collection information, the fifth reservation request 128 identifies the termination of the second tap connection 118 for the backward direction of the main connection 114. The second interception node 116 then removes the SIE altogether, or marks the backwards direction collection information as being complete, and then completes the establishment of the backward main connection 114 by sending a sixth reservation request 130 (having no SIE) towards the source node 102.

The invention has been described in which both establishment of a tap connection during establishment of a main connection and establishment of a tap once a main connection has already been established are supported. Alternatively, either of these two methods of establishing a tap connection may be implemented independently.

The invention has been described in which the taps 44 and 46 are located at an interception node 18 located between the source node 14 and the destination node 16. Alternatively, the taps 44 and 46 could be located at the source node 14. In such an embodiment, the functionality described above of the call controller 42 of the interception node 18 would be carried out instead by the call controller 30 of the source node 14, and the interception node 18 removed altogether. Upon determination by the filter 32 in the source node that a communication is to be monitored, the call controller 30 sends the tap setup requests 27 and 28 towards the monitoring station 24, as described above with reference to step 72 of FIG. 5. The call controller 30 then transmits a standard setup request 25 for the main connection, the setup request 25 having no need for an SIE or collection identifier information. Similarly, if monitoring of the main connection 12 is desired after the main connection 12 has been established, then the call controller 30 within the source node 14 sends the tap setup messages 27 and 28 towards the monitoring station 24 as described above with reference to step 88 of FIG. 6, without having to send a 'Start Monitoring' message. In both cases, the call controller 30 also creates the taps 44 and 46 within the source node 14, and copying of traffic to the tap connections 20 and 22 occurs within the source node. In yet another embodiment, the taps 44 and 46 could be located within the destination node 16, with similar modifications to the methods as would be apparent to a person of ordinary skill in the art.

The embodiments presented are exemplary only and persons skilled in the art would appreciate that variations to the embodiments described above may be made without departing from the spirit of the invention. The scope of the invention is solely defined by the appended claims.

We claim:

1. A method of establishing taps within a connection-oriented communication network which carries a main connection originating at a source node, the method comprising the following steps:

generating a Surveillance Information Element (SIE) at the source node, the SIE including collection identifier information that specifies the location of a monitoring station;

inserting the SIE into a setup request;

launching the setup request to begin establishment of the main connection;

determining whether the setup request includes the SIE at an interception node;

extracting the collection identifier information from the SIE when the SIE is present;

launching a first switched tap connection between an interception point, located at an interception node separate from the source node, and the monitoring station;

creating a first tap for copying traffic from the main connection onto the first switched tap connection; and continuing to establish the main connection once the first tap is created, using a setup request that does not include collection identifier information.

2. The method of claim 1, wherein the collection identifier information includes a first Asynchronous Transfer Mode (ATM) address and a first end point, and wherein establishing the first switched tap connection comprises establishing a Soft Permanent Virtual Circuit (SPVC) to the first ATM address and the first end point.

3. The method of claim 2 wherein the main connection carries traffic in both a first direction and in a second direction, wherein the first tap copies traffic in the first direction to the first switched tap connection, wherein the collection identifier information further includes a second ATM address and a second end point, and wherein the method further comprises the following steps:

establishing, as a second switched tap connection, a second SPVC to the second ATM address and the second end point; and creating a second tap for copying traffic in the second direction onto the second switched tap connection.

4. The method of claim 1 wherein the collection identifier information includes a first Asynchronous Transfer Mode (ATM) address and a main connection identifier, and wherein establishing the first switched tap connection comprises the following steps:

establishing a Switched Virtual Circuit (SVC) to the first ATM address and passing the main connection identifier to the first ATM address.

5. The method of claim 4 wherein the main connection carries traffic in both a first direction and in a second direction, wherein the first lap copies traffic in the first direction to the first switched tap connection, wherein the collection identifier information further includes a second ATM address, and wherein the method further comprises the following steps:

establishing, as a second switched tap connection, a second SVC to the second ATM address and passing the main connection identifier to the second ATM address; and creating a second tap for copying traffic in the second direction onto the second switched tap connection.

6. A system for establishing taps within a connection-oriented communication network, comprising:

a source node at which a main connection originates, the source node comprising a first call controller, the first call controller to:

generate a Surveillance Information Element (SIE), the SIE including collection identifier information that specifies the location of a monitoring station, insert the SIE into a setup request, and launch the setup request to begin establishment of the main connection; and an interception node comprising:

a monitor that determines whether the setup request includes the SIE and extracts the SIE, if present, from the setup request, and a second call controller to:

receive the SIE from the monitor, extract the collection identifier information from the SIE, establish a switched tap connection from the interception node to the first destination specified within the collection identifier information, and create a tap for copying traffic from the main connection to the switched tap connection, wherein the first call controller continues to establish the main connection once the tap is created, using a setup request that does not include collection identifier information.

* * * * *